United States Patent Office 3,226,970
Patented Jan. 4, 1966

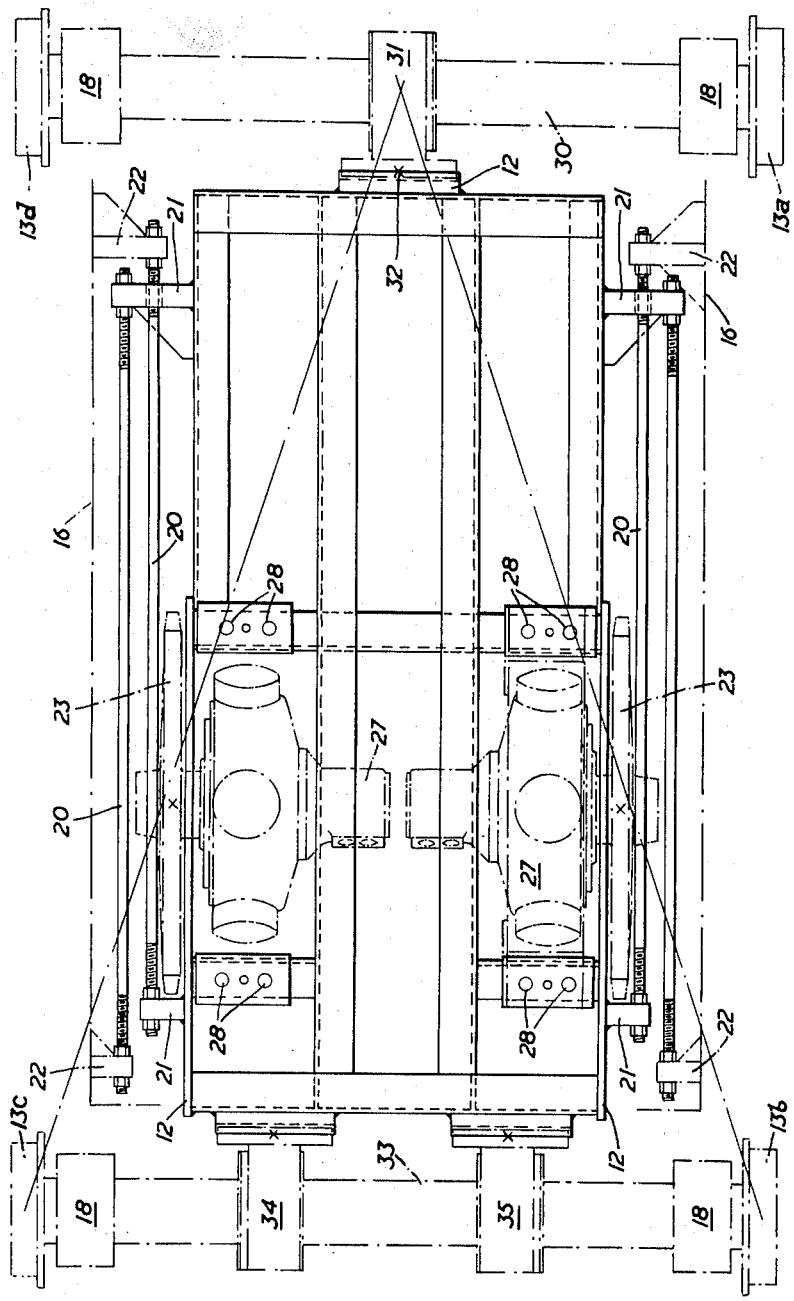

3,226,970
CARRIAGES AND DRIVE MECHANISMS
THEREFOR
Anthony Milton Philipson, Alwoodley, Leeds, and Raymond Bernard Sims, Sheffield, England, assignors to Davy and United Engineering Company Limited, Sheffield, England
Filed July 8, 1963, Ser. No. 293,530
Claims priority, application Great Britain, July 12, 1962
26,828/62
9 Claims. (Cl. 72—420)

This invention relates to carriages and drive mechanisms therefore and more particularly but not exclusively to forging manipulator carriages.

The invention provides a carriage comprising a frame arranged to support the main weight of an object to be carried, an underframe on which the frame is spring mounted, and a rotatable drive member secured to the underframe and adapted for cooperation with a fixed rack, to drive the underframe along a fixed track.

Preferably a first pair of the wheels are mounted on a first shaft which is rotatable in a single self-centering bearing attached to the underframe.

The invention will be more readily understood from the following description of one embodiment thereof, given by way of example only, and illustrated in the drawings accompanying the provisional specification of which:

FIGURE 3 is a plan view of the underframe and drive mechanism of the carriage.

Figure 1:
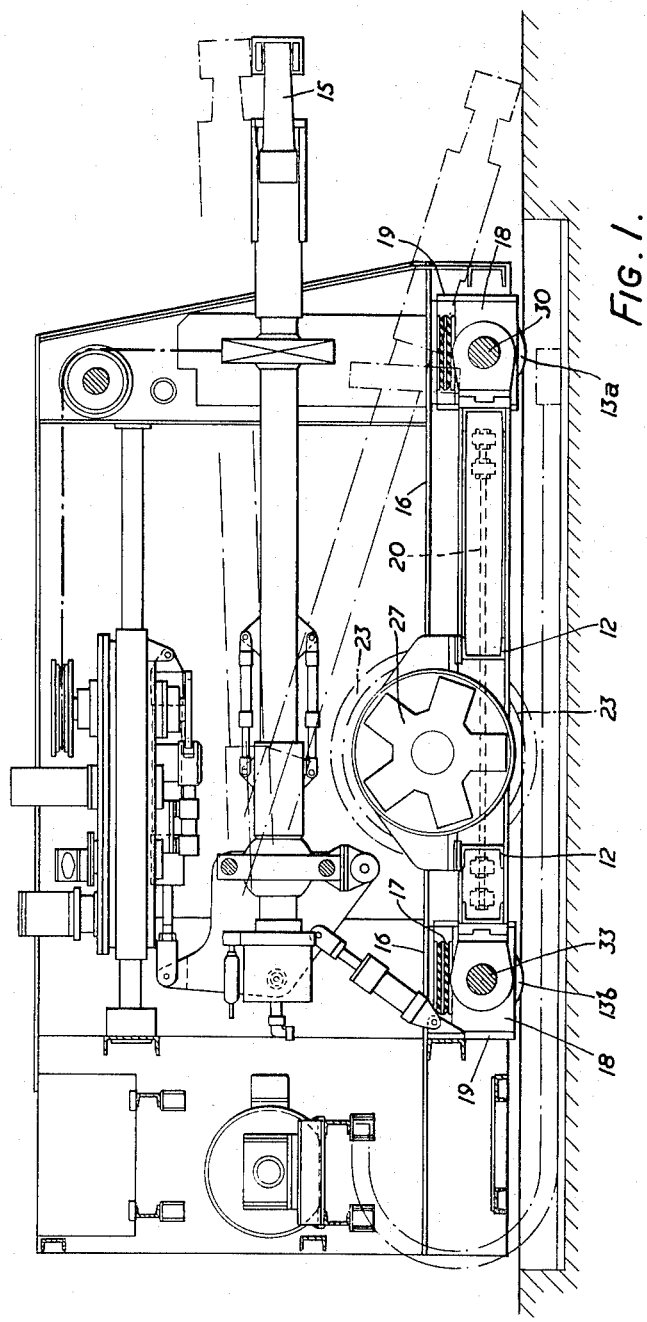
FIGURE 1 is a side view of a manipulator supported on a carriage.

The carriage has an underframe 12 mounted on four wheels 13a–13d, referred to collectively as wheels 13, which run on rails 14. The manipulator 15 with its adjusting mechanism is mounted on a manipulator frame 16, which is spring mounted on the axles 30 and 33 by four rubber bonded spring units 17.

Each spring unit 17 is compressed between the frame 16 and an associated axle block 18, and each axle block 18 is slidably engaged with the frame 16 by means of axle horn guides 19.

Four tie rods 20 best illustrated in FIGURE 3, are each fixed to the underframe 12 by a bracket 21 and to the manipulator frame 16 by a bracket 22 and transmit the motion of the underframe to the manipulator frame. Since there is some clearance between the axle blocks 18 and their associated guides 19 the tie rods 20 serve to prevent undesirable hammering which would occur if this clearance were taken up in one direction on acceleration or deceleration of the underframe.

The present invention is not concerned with the adjusting mechanism shown for the manipulator, which is not therefore described.

Due to the spring mounting of the main load of the carriage, that is the manipulator together with its adjusting mechanism and frame 16, any shock loading of the carriage is as a result of the unsprung but comparatively light underframe and its drive only.

Figure 2:
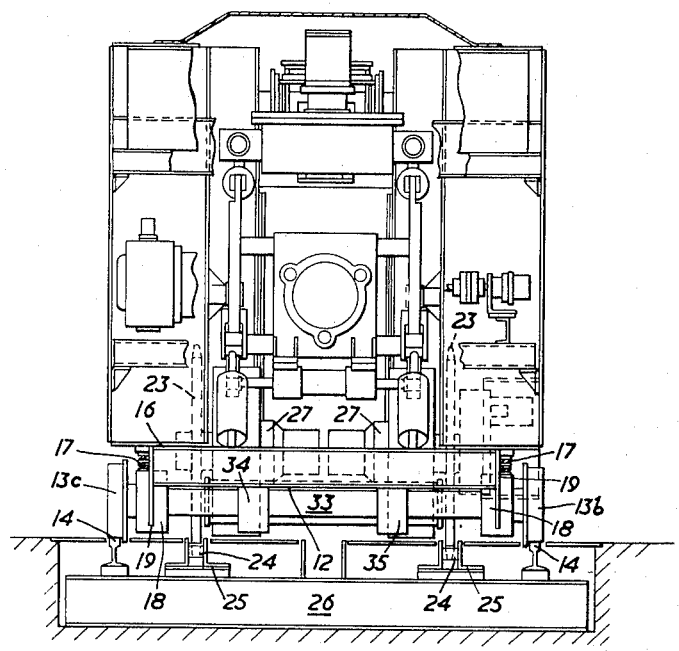
FIGURE 2 is a rear view of the manipulator and carriage of FIGURE 1.

The carriage is driven by rotatable toothed sprocket wheels 23, the teeth of which engage with the pins 24 (FIGURE 2) of pin racks 25 which are secured in a foundation structure 26, and run parallel to the rails 14. The sprocket wheels are driven by five cylinder hydraulic motors 27 secured to the underframe 12 by bolts 28.

Preferably the height of these sprocket wheels and motors relative to the pin racks is adjustable as described in British patent specification No. 934,288.

The front rail wheels 13a–13d are mounted at opposite ends of an axle shaft 30 which rotates in a bearing 31 situated centrally between the wheels 13a–13d and attached to the underframe 12 by a bolt 32. The bearing 31 is of the self-centering kind, allowing swivelling to take place between the underframe and the axle shaft 30.

The rear wheels 13b–13c are mounted on a common shaft 33 which rotates in two bearings 34, 35 which are fixed to the underframe 12. These bearings are also of the self-centering type, but this is for ease of manufacture and does not improve the motion of the undercarriage.

This arrangement of bearings 31, 34, 35 ensures that when the underframe tilts due to rise of a wheel, three wheels will always be in contact with the track, and the underframe will not be subjected to torque due to raising of the wheel.

The centres of the sprocket wheels are, in addition, situated inside vertical planes through lines joining the centre of bearings 31 and the points where their nearest rear wheel contacts the rail. These lines are the axis of rotation of the underframe when one or other of the rear wheels lift. Each of the sprocket wheels, being between the point of lift and the axis of rotation, will raise, and will not be driven further into engagement with the pin rack.

If a front wheel hits an obstruction on the rail, the front axle 30 will pivot about the point of contact of the other front wheel and the rail, thus raising the bearing 31 half of the distance that the wheel is raised, and pivoting the underframe about the points of contact of the rear wheels and the rails. Since the sprockets are positioned nearer to the points of contact of the rear wheels and the rails than to the bearing 31, the sprockets themselves will be raised less than half of the distance that the bearing 31 will be raised.

It will be appreciated that if, as is required, backlash is to be reduced to a minimum, it is important to ensure correct engagement of the sprocket wheels 23 with the pin racks. A method of correctly laying these rails and pin racks is described in British patent specification No. 934,288.

It should be understood that the invention is not limited to the particular embodiment described, and especially that forms of drive other than a toothed sprocket wheel and fixed pin rack may be employed.

Preferably the surface of the rails should be flat, and the wheels of the underframe truly cylindrical.

What we claim is:

1. A carriage comprising an under-frame, a first pair of wheels mounted on a shaft rotatable in a single self centering bearing secured to the under-frame, a second pair of wheels mounted on a shaft rotatable in two spaced bearings secured to the under-frame, a rotatable drive member secured to the under-frame and adapted for cooperation with a fixed rack to drive the wheels along a fixed track, a frame arranged to support the main weight of an object to be carried, and spring mounting means in compression between the frame and the shafts.

2. A carriage comprising an under-frame, a first pair of wheels mounted on a shaft rotatable in a single self-centering bearing secured to the under-frame, a second pair of wheels mounted on a shaft rotatable in two spaced bearings secured to the under-frame, a first drive member secured to the under-frame and adapted for cooperation with a fixed drive member secured to the ground, to drive the wheels along a fixed track, the point of contact of the first drive member with the fixed drive member being located on or between vertical planes through lines joining the center of the self-centering bearing and the points of contact of the second pair of wheels with the fixed track.

3. A carriage according to claim 2 including a frame arranged to support a manipulator and spring mounting means through which the frame is mounted on the shafts.

4. A carriage according to claim 2 in which the first drive member comprises a hydraulically driven sprocket wheel rotatable about a horizontal axis and the fixed drive member comprises a pin rack.

5. A carriage according to claim 4 including a frame arranged to support the main weight of an object to be carried and spring mounting means held in compression between the frame and the shafts.

6. A carriage comprising an under-frame, a first pair of wheels mounted on a shaft rotatable in a single self-centering bearing secured to the under-frame, a second pair of wheels mounted on a shaft rotatable in two spaced bearings secured to the under-frame, a rotatable drive member secured to the under-frame and adapted for cooperation with a fixed rack to drive the wheels along a fixed track, the rotatable member being located on or between vertical planes through lines joining the center of the self-centering bearing and the points of contact of the second pair of wheels with the fixed track, a frame arranged to support the main weight of an object to be carried, spring mounting means held in compression between the frame and the shafts, and a plurality of horizontal tie-rods connected between the frame and the under-frame.

7. A carriage comprising an under-frame, a first pair of wheels mounted on a shaft rotatable in a single self-centering bearing secured to the under-frame, a second pair of wheels mounted on a shaft rotatable in two spaced bearings secured to the under-frame, a first drive member secured to the under-frame and adapted for cooperation with a fixed drive member to drive the wheels along a fixed track, a frame arranged to support the main weight of an object to be carried, the frame being mounted on the shafts through a plurality of spring units, each spring unit being compressed between the frame and an axle block, and a plurality of horizontal tie-rods connecting the frame and the under-frame.

8. A manipulator carriage comprising an under-frame, a first pair of wheels mounted on a shaft rotatable in a single self-centering bearing secured to the under-frame, a second pair of wheels mounted on a shaft rotatable in two spaced bearings secured to the under-frame, first drive means secured to the under-frame for cooperation with fixed drive means secured to the ground, the drive means being arranged to drive the wheels along a fixed track, a plurality of spring mounting units mounted on blocks carried on the shafts, a frame being carried on the spring units, and a plurality of tie-bars connected between the frame and the under-frame.

9. A manipulator carriage according to claim 8 in which the drive means comprises a pair of hydraulically driven sprocket wheels mounted on the under-frame for rotation about a horizontal axis, and a pair of fixed racks, mounted on the ground parallel to the fixed track, each sprocket wheel being located on or between vertical planes through lines joining the center of the self-centering bearing and the points of contact of the second pair of wheels with the fixed track, and each sprocket wheel being located nearer to the point of contact of the nearer of the second pair of wheels with the fixed track, than to the self-centering bearing.

References Cited by the Examiner
UNITED STATES PATENTS

| | | | |
|---|---|---|---|
| 1,027,077 | 5/1912 | Sessions | 105—29 |
| 1,480,635 | 1/1924 | Putnam | 105—29 |
| 2,782,730 | 2/1957 | Frank | 105—29 |

CHARLES W. LANHAM, *Primary Examiner.*

LEO QUACKENBUSH, WILLIAM J. STEPHENSON,
*Examiners.*